US007342375B2

(12) United States Patent
Johansen

(10) Patent No.: US 7,342,375 B2
(45) Date of Patent: Mar. 11, 2008

(54) AUTOMATIC STORM SHUTTER CONTROL

(76) Inventor: Paul R Johansen, 805 Bentwater Cir., #104, Naples, FL (US) 34108

( * ) Notice: Subject to any disclaimer, the term of this patent is extended or adjusted under 35 U.S.C. 154(b) by 0 days.

(21) Appl. No.: 11/475,370

(22) Filed: Jun. 27, 2006

(65) Prior Publication Data

US 2007/0007923 A1 Jan. 11, 2007

Related U.S. Application Data

(60) Provisional application No. 60/694,897, filed on Jun. 29, 2005.

(51) Int. Cl.
*G05B 21/00* (2006.01)

(52) U.S. Cl. ...................... 318/483; 318/445; 318/484; 318/285; 318/447; 318/139

(58) Field of Classification Search ................ 318/483, 318/445, 484, 285, 447, 139
See application file for complete search history.

(56) References Cited

U.S. PATENT DOCUMENTS

| | | | | | |
|---|---|---|---|---|---|
| 3,968,342 | A | * | 7/1976 | Inaba | 219/203 |
| 4,147,073 | A | | 4/1979 | Mercier | |
| 4,160,458 | A | | 7/1979 | Marcellus | |
| 4,174,494 | A | * | 11/1979 | Pfeffer | 318/54 |
| 4,247,806 | A | | 1/1981 | Mercier | |
| 4,484,069 | A | * | 11/1984 | Brenholdt | 356/3.02 |
| 4,544,865 | A | | 10/1985 | Sharp | |
| 4,544,866 | A | | 10/1985 | Clemmons et al. | |
| 5,225,748 | A | | 7/1993 | Haring | |
| 5,449,987 | A | | 9/1995 | McMillan | |
| 5,532,560 | A | * | 7/1996 | Element et al. | 318/266 |
| 5,760,558 | A | * | 6/1998 | Popat | 318/480 |
| 5,793,174 | A | | 8/1998 | Kovach et al. | |
| 5,990,646 | A | | 11/1999 | Kovach et al. | |
| 6,057,658 | A | | 5/2000 | Kovach et al. | |
| 6,181,089 | B1 | | 1/2001 | Kovach et al. | |
| 6,259,218 | B1 | | 7/2001 | Kovach et al. | |
| 6,369,530 | B2 | | 4/2002 | Kovach et al. | |
| 6,484,069 | B2 | | 11/2002 | Osinga | |
| 6,646,560 | B1 | | 11/2003 | Krasenics, Jr. | |
| 6,684,069 | B1 | * | 1/2004 | Yoon | 455/414.1 |
| 6,732,018 | B2 | | 5/2004 | Osinga | |
| 6,755,230 | B2 | | 6/2004 | Ulatowski et al. | |
| 6,798,158 | B2 | | 9/2004 | Evans | |
| 2006/0144438 | A1 | * | 7/2006 | Dresselhaus et al. | 137/78.3 |

* cited by examiner

*Primary Examiner*—Rita Leykin
(74) *Attorney, Agent, or Firm*—Pine Knoll IP Technologies, LLC; Ronnie L. Pratt

(57) ABSTRACT

The present invention provides wireless and direct wired methods and devices for automatically closing electrically-driven roll-down storm shutters in the presence of rain on one or more rain sensors.

21 Claims, 9 Drawing Sheets

AUTOMATIC STORM SHUTTER CONTROL

CROSS REFERENCE TO RELATED APPLICATIONS

This application claims the benefit of U.S. Provisional patent application Ser. No. 60/694,897 filed on Jun. 29, 2005 and titled AUTOMATIC STORM SHUTTER CONTROL, which is hereby incorporated by reference in its entirety.

BACKGROUND

In tropical and sub-tropical climates, retractable, roll-down storm shutters provide effective and convenient protection from damage caused by wind-driven rain. When fully retracted, roll-down storm shutters let in sunshine and fresh air and provide a view. When fully closed, they keep wind-driven rain out. Many homeowners in these climates depend on retractable storm shutters to protect furniture, flowering plants and other valuable articles on their screened-in porches and lanais from damage caused by seasonal rain storms. Typical homeowners prefer to leave their storm shutters up while they are at home to enjoy the daylight and view that screened porches and lanais provide. They would also benefit from having their storm shutters close automatically if a rain shower occurred while they were asleep or away from home and were unable to lower them manually. Current retractable roll-down shutters can be manually raised or lowered by means of a hand crank or they can be raised and lowered by electric motors that are controlled by manual wall switches inside the home or by wall mounted or handheld radio frequency remote controllers.

Rain sensors presently available for use with electric storm shutters have not been commercially successful for several reasons.

One existing system, designed for extending and retracting a single awning, has been modified to control a single storm shutter. This system comprises an electronic module installed on a wall inside the house which can control one drive motor. It contains low-voltage connections to which rain, wind and/or sun sensors may be attached, and power connections for connecting the control system to 120 VAC mains. The unit includes one wall switch for manual control of one drive motor. If it is required to control two or more shutters using this system, an additional power module must be mounted in a weatherproof enclosure near the shutter drive motor power connections on the porch or lanais. If it is desired to retain individual manual control of the shutter motors will wall-mounted switches, two additional unswitched wires (120 VAC and Neutral) must be routed to the power module in addition to three wires for each wall switch. Additionally, if it is desired to use more than one rain sensor with this system, an external 12 VAC power supply must be added. This control system contains a microprocessor that must be programmed in order for it to function properly. The rain sensors are not programmable via the electronic control module, but have adjustable settings inside the sensors, which include discrete levels of sensitivity to moisture and adjustable delay times to react to detected moisture.

In another existing system, also designed for awning control, but conceivably adaptable to electric storm shutters, the rain sensor requires 230 VAC and draws 30 millimeters of current. Its power supply requirement severely limits the placement of these sensors to locations where 230 VAC is readily available or easily routed, an unlikely situation in US residential applications.

SUMMARY OF THE INVENTION

The present invention overcomes the problems described above. It can be installed as one unit, directly on the wall where the manual switches would be. It does not require programming. It preserves the ability to manually control two or more motors independently without additional electrical equipment. Several sensors may be implemented without requiring additional external power; this is useful if the lanais is exposed to weather in two or more directions. Sensors used in this invention can be installed inside the plane of the shutters, so they are not exposed to rain while the shutters are down. This greatly reduces the rate of oxidation or corrosion of the sensor surfaces and extends their useful lifetimes.

In one aspect, the present invention provides a wireless method of controlling electrically-powered roll down storm shutters by providing one or more sensing devices each with a rain sensor, a detector and a radio frequency transmitter and by providing a controlling device with a radio frequency receiver, an activation circuit, and a controller whereby the presence of rain on the sensor or sensors is detected by the detector and the transmitter sends a radio frequency signal to the controlling device connected to the storm shutter motor or motors and causes the shutter or shutters to be lowered.

In another aspect, the present invention provides a wireless method of controlling storm shutters by providing one or more sensing devices each with a rain sensor, a detector and a radio frequency transmitter whereby the presence of rain on the sensor or sensors is detected by the detector and the transmitter sends a radio frequency signal to a compatible receiver/controller connected to the storm shutter motor or motors and causes the shutter or shutters to be lowered.

In another aspect, the present invention provides a direct wired method of controlling storm shutters by providing a detector/activation circuit, by providing one or more rain sensors which are connected to the detector/activation circuit by means of a direct-wired connection, and by providing a controller which is electrically connected to the detector/activation circuit and to one or more motors which drive the storm shutters whereby the presence of rain on the sensor or sensors is detected by the detector/activation circuit and the controller sends power to the motors and causes the shutters to be lowered.

In another aspect, the present invention provides a wireless device for controlling electrically-powered roll down storm shutters including one or more sensing devices; each with a rain sensor, a detector and a radio frequency transmitter; and a controlling device, the device with a radio frequency receiver, an activation circuit, and a controller which is connected to the activation circuit and to one or more motors which lower the storm shutter or shutters in the event of rain.

In another aspect, the present invention provides a wireless device for controlling electrically-powered roll down storm shutters including one or more sensing devices; each with a rain sensor, a detector and a radio frequency transmitter wherein the transmitter is of a frequency to communicate with a receiver/controller or receiver/controllers connected to a motor or motors for lowering storm shutters in the event of rain.

In another aspect, the present invention provides a direct wired device for controlling electrically-powered roll down storm shutters including a detector/activation circuit powered by a DC power supply; one or more rain sensors which are connected to the detector/activation circuit by means of a direct-wired connection; and a controller which is electrically connected to the detector/activation circuit and to one or more motors which lower the storm shutters in the event of rain.

These and other features and advantages of the present invention are described below in connection with various illustrative embodiments of the devices and methods of the present invention.

DETAILED DESCRIPTION OF THE INVENTION

The present invention provides methods and devices for automatically closing electrically-driven roll-down storm shutters in the presence of rain on one or more rain sensors. More particularly, the present invention provides wireless and direct-wired methods and devices for this purpose. The present invention also provides methods for placing the sensor or sensors inside the vertical plane of the shutters to better detect the presence of potentially damaging wind-driven rain. Placement inside the plane of the shutters also prolongs sensor life by reducing its exposure to the rain after the shutters have been closed as well as providing for easier cleaning or replacement. The present invention also provides simple, easy to use devices that can be retrofitted on existing shutters or installed during new shutter installations.

Although various constructions of illustrative embodiments are described below, automatic control devices of the present invention may be manufactured according to the principles described in U.S. Provisional patent application Ser. No. 60/694,897 filed on Jun. 29, 2005 and titled AUTOMATIC STORM SHUTTER CONTROL.

Figure 1:
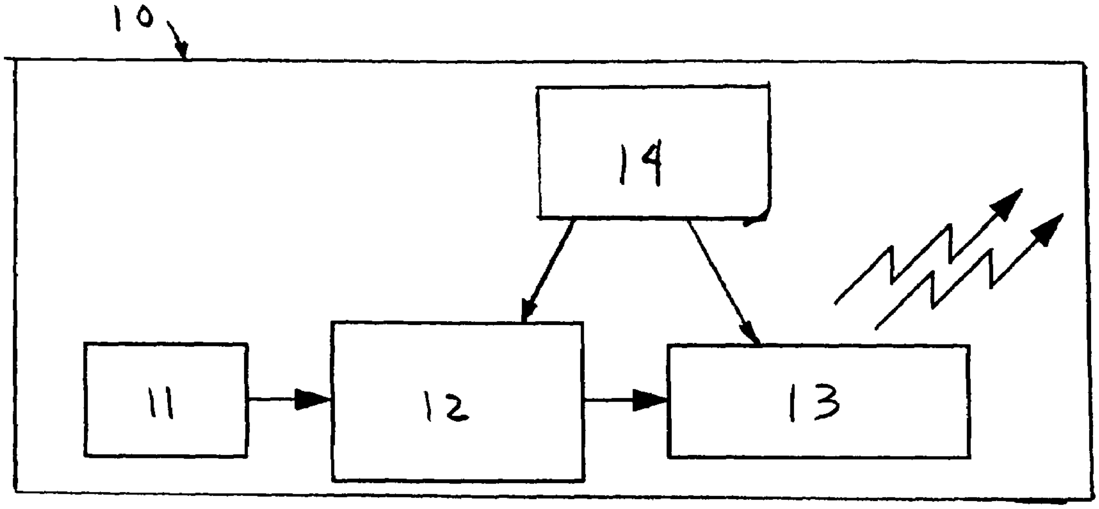
FIG. 1 is a block diagram of a wireless rain sensing device.

One simple wireless rain sensing device is illustrated in a block diagram format in FIG. 1. The wireless device 10 includes a sensor 11 which is connected to a detector 12 which is in turn connected to a radio frequency transmitter 13. Both the detector 12 and transmitter 13 are powered by a battery 14. This wireless device is designed to be used with "smart" controller/motor systems such as the Radio Technology Somfy™ (RTS) motor line manufactured by Somfy Group, Cluses, France and distributed in the US by Somfy Systems North America, Inc. of Boca Raton, Fla. 33482 which have built-in receiver/controller systems for controlling the motor. The sensor transmitter is designed to operate on the same radio frequency as the receiver in the "smart" motor. This device allows for flexibility in placement such that it can be placed anywhere outside, or preferably, inside the vertical plane of the shutter, or more preferably, inside the plane of each shutter. Using this method, the presence of wind-driven rain can be detected in whatever direction, and all the shutters can be closed automatically. Alternatively, only the shutters with wet sensors can be closed, thereby protecting the contents of the lanais or porch, but still allowing light and a view in directions not affected by the rain. Similarly, if there is no wind and rain is falling vertically, the sensors will remain dry and the shutters can remain open with no damage to the contents of the lanais or porch.

The detector 12 may contain circuitry to detect a low battery condition in order to have the transmitter 13 signal the "smart" motor to lower the shutters so that a "dead" battery condition does not cause inadvertent damage should rain occur.

Figure 2:
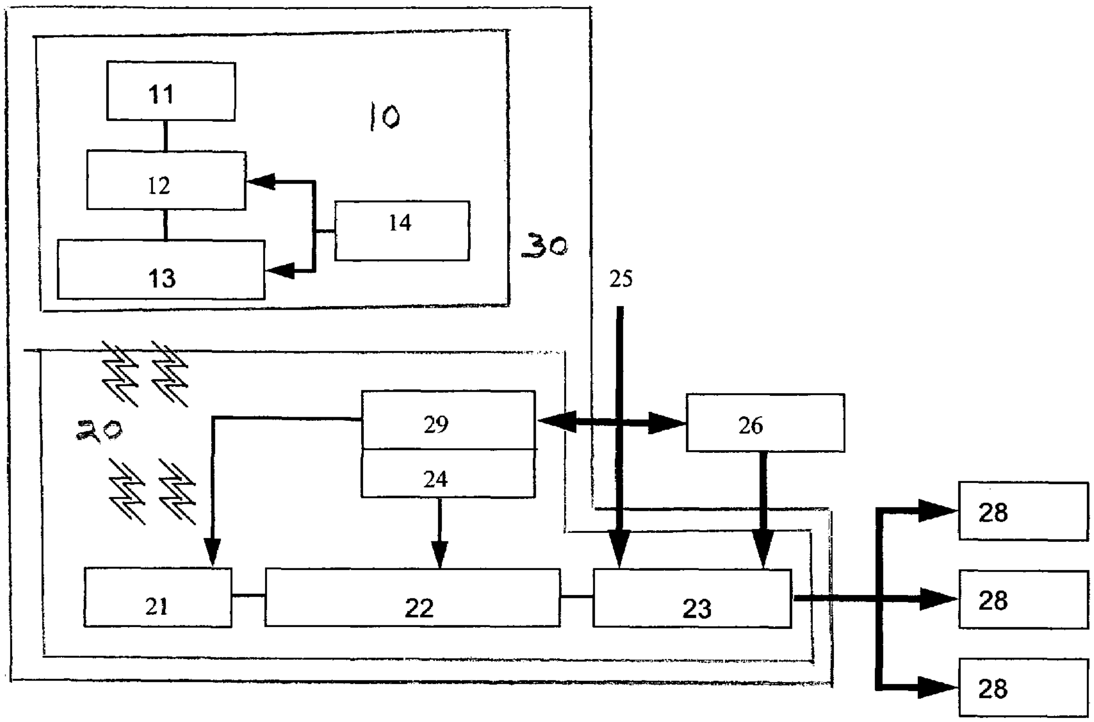
FIG. 2 is a block diagram of a wireless device for automatically controlling storm shutters during the presence of rain.

Another wireless device for controlling one or more shutter motors is illustrated in a block diagram format in FIG. 2. The wireless device 30 includes one or more sensing devices 10 as described above and a controlling device 20. The controlling device 20 includes a radio frequency receiver 21 which is powered by a transformer 29 which is in turn powered by 120 VAC mains power 25, an activation circuit 22, and a controller 23, both powered by a rectifier 24 which is in turn powered by 120 VAC mains power 25 via the transformer 29.

The presence of rain on one or more sensors causes a radio frequency signal to be transmitted to the controlling device 20 which provides 120 VAC power 25 to the motors 28 and causes the shutters to be closed. Wall switches 26 can be used to manually operate the shutters. Radio frequency wall-mounted switches or handheld remote control devices can also be used to operate the shutters.

In addition to the advantages in sensor placement as described above, this device can also include circuitry in the detector and/or controller to open the shutters after the sensor or sensors no longer detect the presence of rain. An adjustable clock timer can also be included to provide for a prescribed delay after the sensors have become dry or to control the opening and closing of the shutters at prescribed times. An additional temperature sensor can be included to lower the shutters if the temperature is too warm or too cold. The controller may include circuitry to sound an audible alarm or to provide a visual signal warning of the presence of rain. The controlling device may also include circuitry to be activated remotely by telephone or computer control to raise or lower the shutters. This device could be used to automatically control awnings without departing from the scope of the invention.

Figure 3:
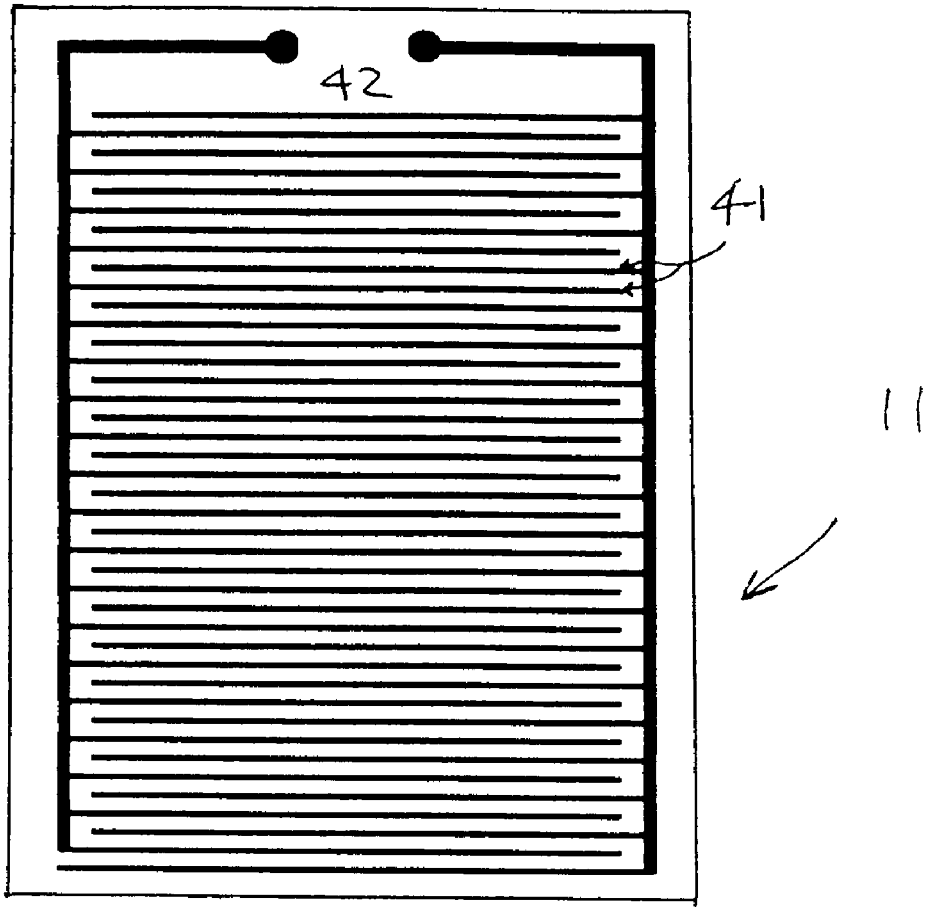
FIG. 3 is a plan view of a rain sensor.

One illustrative rain sensor manufactured according to the principles of the present invention is illustrated in FIG. 3. The rain sensor 11 was made by interlacing alternating conductive strips 41 on a simple printed circuit board 42 in a configuration such that a small drop of water spanning any two adjacent strips changes the circuit's resistance from infinite to a range of approximately 0.1 Megohms to 1.0 Megohms. Sensors made from 1.59 mm copper clad fiberglass/epoxy printed circuit board material, approximately 76 mm wide by 102 mm long, with conducting strips 1.59 mm separated by spaces 1.59 mm were used experimentally.

It was observed that the bare copper conductive strips on the sensor faces oxidized with continuous exposure to the weather, and their resistance increased, decreasing their sensitivity to rain drops. Several sensors plated with 0.0075 to 0.0125 micrometers of immersion gold over 0.25 to 0.50 micrometers of electroless nickel were made and evaluated. Over a period of several months, they showed no signs of oxidation or corrosion and no perceivable decrease in sensitivity. Other materials such as chromium, palladium or rhodium that resist oxidation or corrosion and other methods in addition to electroless plating such as vacuum deposition, sputtering or chemical vapor deposition may be used as well without departing from the present invention.

The selection of conductive strip spacing, the protective coating, and the placement of the sensor within the vertical plane of the shutter all contribute to a sensitive, reliable and rapidly responding sensor. Other configurations for the rain sensor or other sensors to detect, for example, high winds or cold temperatures, may be used without departing from the scope of the invention.

Figure 4:
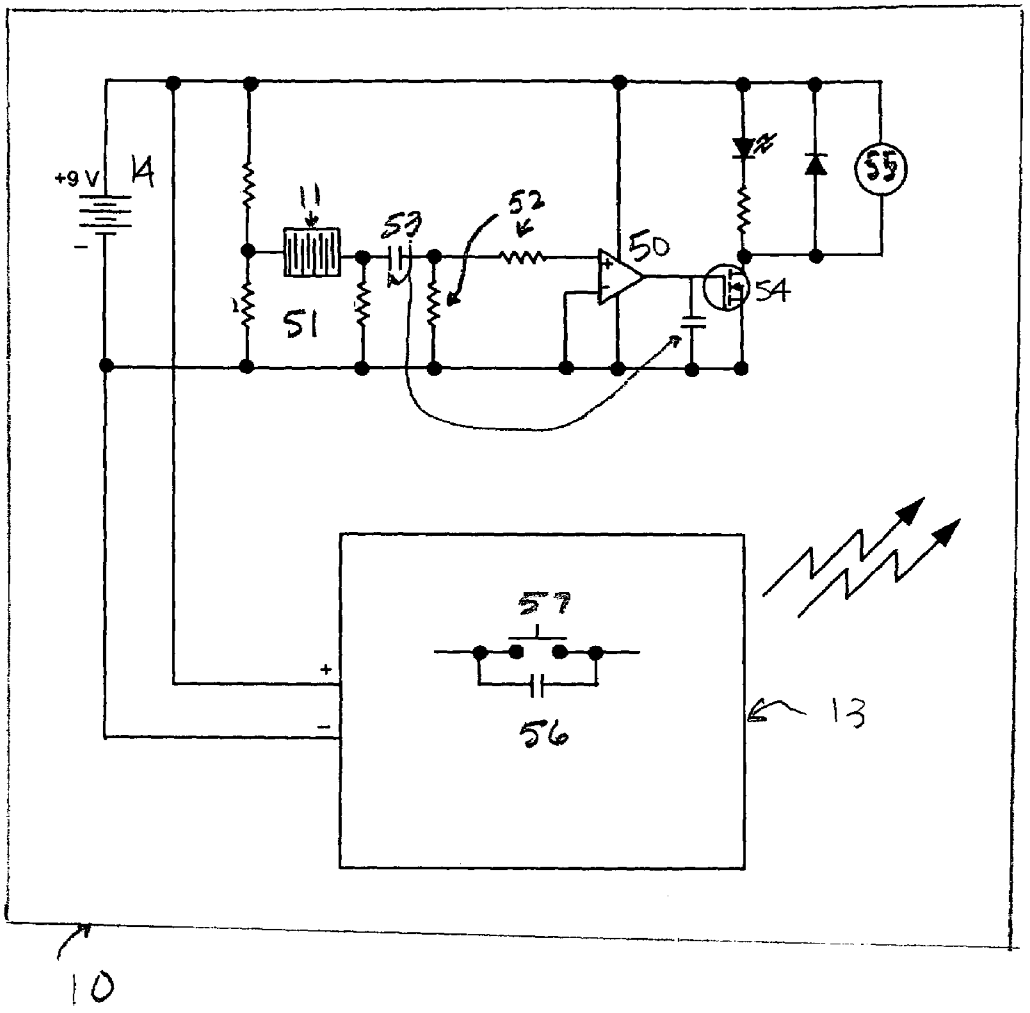
FIG. 4 is a circuit diagram of a wireless rain sensing device.

An illustrative circuit diagram of the sensing device 10 is shown in FIG. 4. In this circuit, the appearance of a current through the sensor 11 as a result of an impinging raindrop causes a voltage impulse to appear at the positive input of the operational amplifier 50, which in this configuration acts as a comparator. The magnitude and duration of the impulse are determined by the 100K and 10K resistors 51, 52 and the 0.1 uF capacitor 53 in the RC network between the sensor and the operational amplifier. The output of the operational amplifier goes from zero volts to nearly 9 volts in response to the input impulse. This voltage fires the MOSFET circuit 54, which supplies sufficient current to drive the relay coil 55. The closure of the relay contact 56 provides the equivalent of a manual pushbutton switch 57 closure to the transmitter 13. An important feature of this circuit is its very low current consumption: the idle current through the voltage divider on the front end is nominally 9/2,000,000=4.5 microamperes. The idle current consumed by the operational amplifier (one half of a MAX417) is nominally 8 microamperes. Thus the total continuous idle current drawn by this circuit is approximately 12.5 microamperes. The RC network was optimized to produce a voltage large enough and have a time constant long enough to fire the MOSFET, which is a high impedance device. With the MOSFET capacitor chosen properly, a relay closure of approximately one second can be achieved. Since the relay draws approximately 20 millimeters, it is important, from consideration of battery life, that the relay activation cycle be as short as possible, consistent with overall performance of the system. The normally open relay contacts are wired directly across the normally open terminals of the pushbutton switch on the transmitter board (Stanley Garage Door Opener Digital Transmitter, Model 1050, Stanley Tools, New Britain, Conn. 06053). The 9-volt battery 14 also powers the transmitter circuit. Other circuits that perform the same function may be substituted for the circuit described herein without departing from the scope of this invention.

Figure 5:
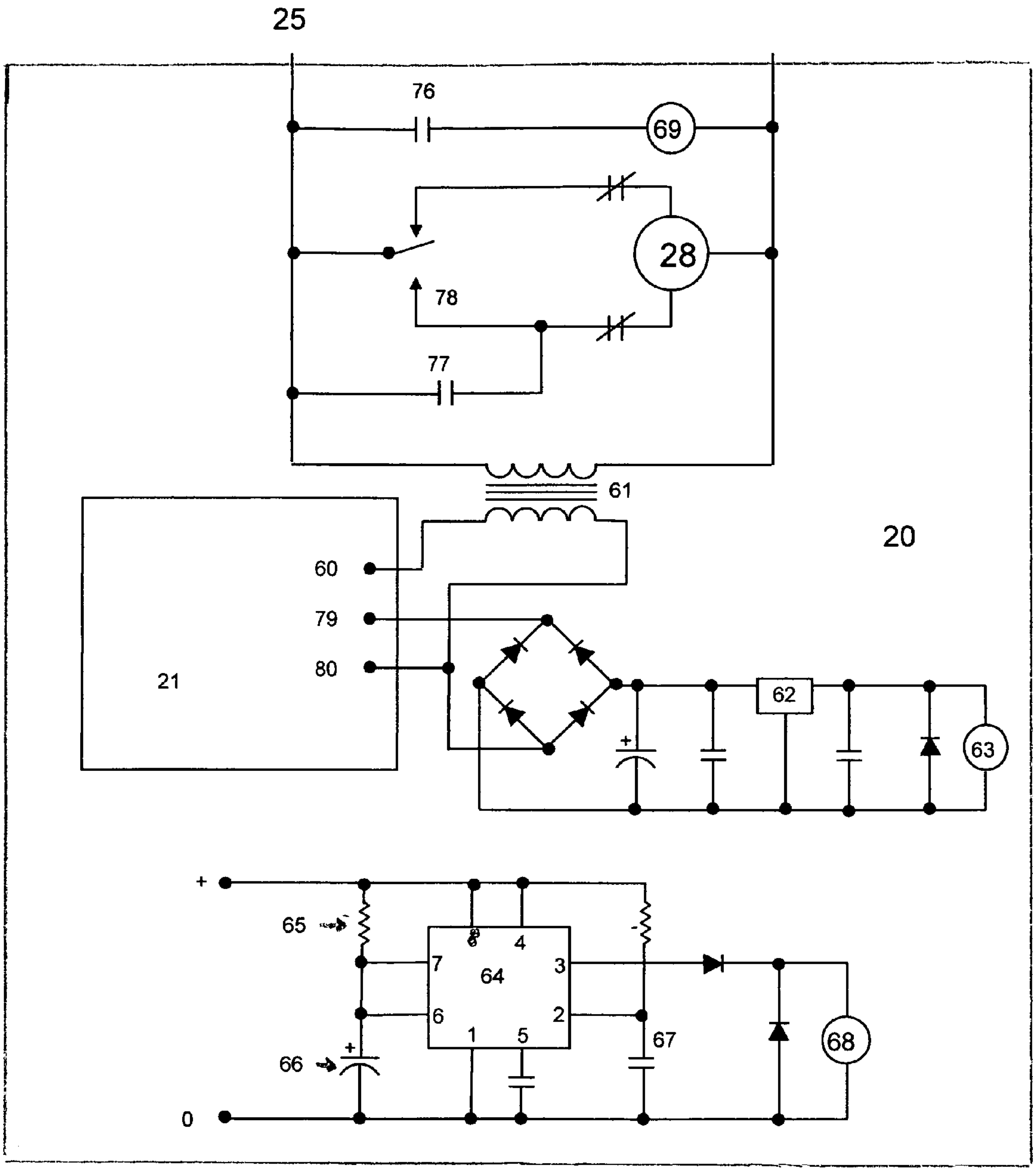
FIG. 5 is a circuit diagram of a wireless device for automatically controlling storm shutters during the presence of rain.

An illustrative circuit diagram for the wireless controlling device 20 is shown in FIG. 5. The receiver board 21 (Stanley Garage Door Opener Digital Receiver, P/N 201906) is powered by 26 VAC 60, obtained by stepping down line voltage 120 VAC 25 via a transformer 61. When the receiver detects a radio frequency pulse from the transmitter, a corresponding 26 VAC pulse appears across the relay 79 and common 80 terminals of the receiver board 21. The pulse is rectified and regulated by a voltage regulator 62 to 9 VAC, which drives the timer relay coil 63. The activation circuit uses a 555 timer chip 64, which produces an output voltage of approximately ⅔ of the source voltage (⅔*9=6 volts) for time intervals up to several seconds. In this application, the 1.1 Megohm resistor 65 and the 32 uF capacitor 66 provide a timed interval of approximately 45 seconds. The timing sequence is initiated by closure of the timer relay contacts 67. This output voltage of the timer chip energizes the control relay coil 68, which in turn energizes the power relay coil 69 via the control relay contacts 76, and the power relay contacts 77 connect 120 VAC line power to the "DOWN" terminal 78 of the shutter drive motor 28. Again, other circuits that perform the same function may be used without departing from the scope of this invention.

Figure 6:
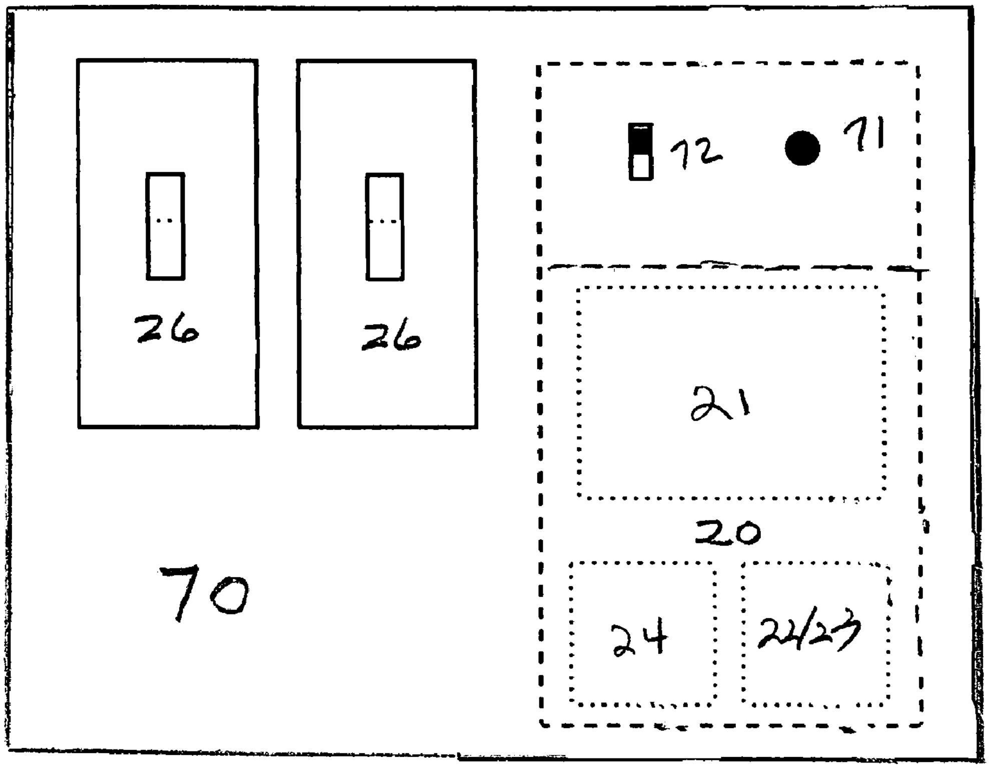
FIG. 6 is a plan view of a wireless device for automatically controlling storm shutters during the presence of rain mounted in a plastic utility enclosure with manual switches.

The wireless controlling device as described above is shown in a wall-mounted enclosure approximately 127 mm×152 mm×38 mm as illustrated in FIG. 6. The manual switches 26 occupy the left half of the plastic utility enclosure 70 whereas the power supply 24, the receiver board 21, and the activation circuit/controller board 22/23 occupy the right half of the enclosure. An optional rain status LED 71 and an automatic/manual mode switch 72 have also been installed on the right half of the enclosure. Other configurations may used without departing from the scope of the invention.

Figure 7:
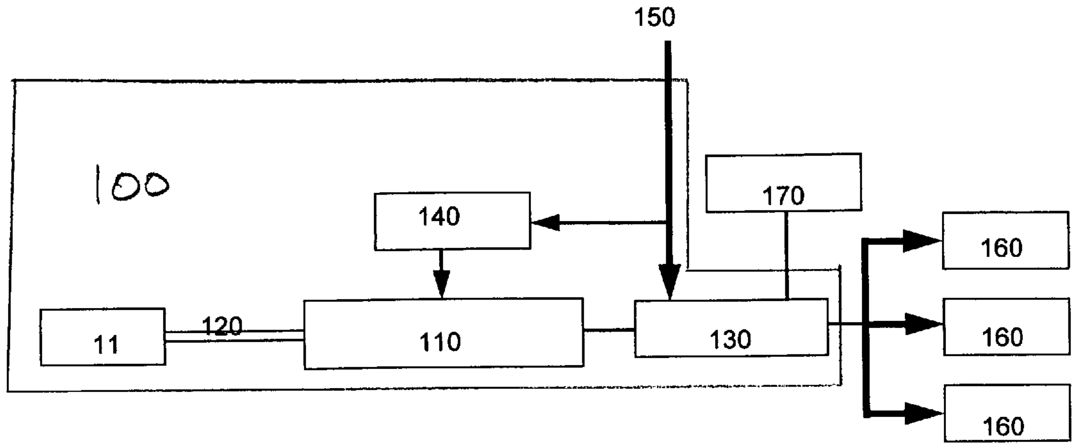
FIG. 7 is a block diagram of direct wired device for automatically controlling storm shutters during the presence of rain.

A direct wired automatic shutter control device is illustrated in a block diagram format in FIG. 7. The device 100 includes one or more rain sensors 11 connected to a detector/activation circuit 110 by a two wire cable 120. The detector/activation circuit is connected to a controller 130. Both the detector/activation circuit and the controller are connected to and powered by a DC power supply 140 which is in turn powered by 120 VAC mains power 150.

The presence of rain on one or more of the sensors causes a significant drop in resistance which is detected by the detector/activation circuit which in turn sends a signal to the controller which provides 120 VAC power to one or more motors 160 and causes the shutters to be closed. Alternative circuitry can be used to individually control multiple shutters if so desired. Wall mounted manual switches 170 can be used to manually operate the shutters.

Figure 8:
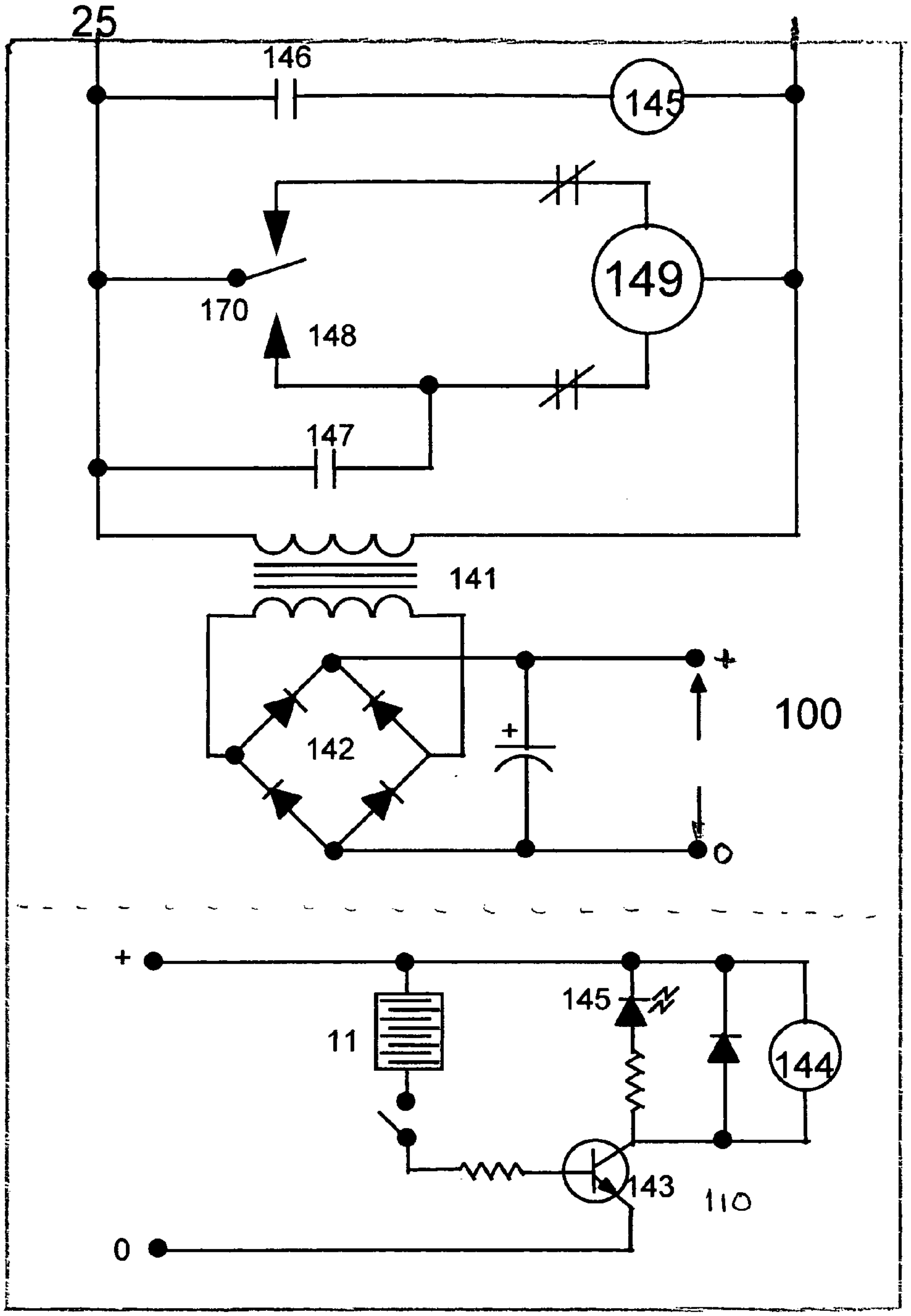
FIG. 8 is a circuit diagram of a direct wired device for automatically controlling storm shutters during the presence of rain.

An illustrative circuit diagram for the direct wired automatic shutter control device 100 is shown in FIG. 8. The device for the direct wired system includes a transformer 141 and rectifier 142 for reducing the 120 VAC line voltage 25 to 15 VAC for supplying the detector/activation circuit 110. In this circuit, the appearance of a current through the sensor 11 as a result of an impinging raindrop causes a small current to flow into the base of the NPN transistor 143, which in turn supplies sufficient current to drive the control relay coil 144. An optional LED 145 is also activated by the transistor current, indicating the presence of rain on the sensor surface. The control relay coil energizes the power relay coil 145 via the control relay contacts 146, and the power relay contacts 147 connect 120 VAC line power to the "DOWN" terminal 148 of the shutter drive motor 149. Other circuits that perform the same function may be used without departing from the scope of this invention.

Figure 9:
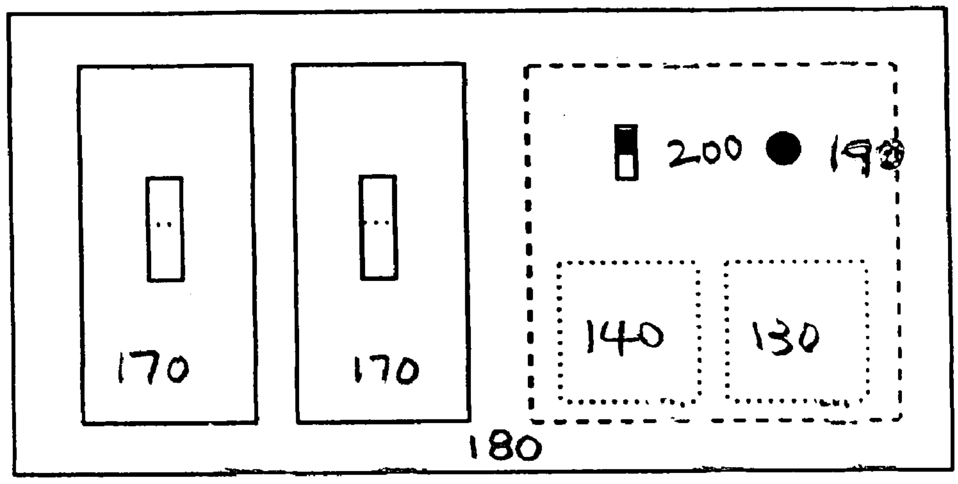
FIG. 9 is a plan view of a direct wired device for automatically controlling storm shutters during the presence of rain mounted in a plastic utility enclosure with manual switches.

The detector/activation circuit, the controller, and the DC power supply as described above are shown in a wall-mounted enclosure approximately 127 mm×152 mm×38 mm as illustrated in FIG. 9. The manual switches 170 occupy the left half of the plastic utility enclosure 180 whereas the controller and detector/activation circuit 130 and the DC power supply 140 occupy the right half of the enclosure. An optional rain status LED 190 and an optional automatic/manual mode switch 200 have also been installed on the right half of the enclosure. Other configurations may used without departing from the scope of the invention.

Patents, patent applications, and publications disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope of this invention, and it should be understood that this invention is not to be unduly limited to the illustrative embodiments set forth herein.

The invention claimed is:

1. A method of controlling electrically-powered roll down storm shutters comprising: providing one or more sensing devices, each device further comprising, providing a radio frequency transmitter, providing a detector which is electrically connected to the transmitter, providing a battery which is electrically connected to the transmitter and to the detector and supplies power to them, providing a rain sensor which is electrically connected to the detector; providing a controlling device, the device further comprising, providing an activation circuit, providing a radio frequency receiver which is electrically connected to the activation circuit, providing a DC power supply which is powered by 120 VAC mains power and which is electrically connected to the receiver and to the activation circuit, providing a controller which is powered by 120 VAC mains power and is connected to the activation circuit and to one or more motors which drive the storm shutters; and, optionally, providing manual override switches which are connected to the controlling device to manually control the position of the storm shutters whereby the presence of rain on the sensor or sensors is detected by the detector and the transmitter sends a radio frequency signal to the controlling device connected to the storm shutter motor or motors and causes the shutter or shutters to be lowered.

2. The method of claim 1, wherein the controlling device provides 120 VAC power to the motors to raise the storm shutters a finite time interval after the sensor or sensors have become dry, the time interval being adjustable.

3. The method of claim 1, wherein the controlling device can provide 120 VAC power to raise or lower the storm shutters at prescribed times.

4. The method of claim 1, wherein the controlling device automatically closes the storm shutters upon detecting a low battery condition.

5. The method of claim 1, wherein the sensing device or devices are placed inside the vertical plane of the shutters.

6. A method of controlling electrically-powered roll down storm shutters comprising: providing one or more sensing devices, each sensing device further comprising, providing a radio frequency transmitter, providing a detector which is electrically connected to the transmitter, providing a battery which is electrically connected to the transmitter and to the detector supplies power to them, and providing a rain sensor which is electrically connected to detector whereby the presence of rain on the sensor or sensors is detected by the detector and the transmitter sends a radio frequency signal to a compatible receiver/controller connected to the storm shutter motor or motors and causes the shutter or shutters to be lowered.

7. The method of claim 6, wherein the controller automatically closes the storm shutters upon detecting a low battery condition.

8. The method of claim 6, wherein the sensing device or devices are placed inside the vertical plane of the shutters.

9. A method of controlling electrically-powered roll down storm shutters comprising: providing a detector/activation circuit; providing a DC power supply which is powered by 120 VAC mains power and which is electrically connected to the detector/activation circuit; providing one or more rain sensors which are connected to the detector/activation circuit by means of a direct-wired connection; providing a controller which is powered by 120 VAC mains power and is electrically connected to the detector/activation circuit and to one or more motors which drive the storm shutters; and, optionally, providing manual override switches which are electrically connected to the controller to manually control the position of the storm shutters whereby the presence of rain on the sensor or sensors is detected by the detector/activation circuit and the controller provides 120 VAC power to the motors and causes the shutters to be lowered.

10. The method of claim 9, wherein the controlling device provides 120 VAC power to the motors to raise the storm shutters a finite time interval after the sensor or sensors have become dry, the time interval being adjustable.

11. The method of claim 9, wherein the controlling device can provide 120 VAC power to raise or lower the storm shutters at prescribed times.

12. The method of claim 9, wherein the sensor or sensors are placed inside the vertical plane of the shutters.

13. A device for controlling electrically-powered roll down storm shutters, the device comprising: one or more sensing devices, each device further comprising a radio frequency transmitter, a detector which is electrically connected to the transmitter, a battery which is electrically connected to the transmitter and to the detector and supplies power to them, a rain sensor which is electrically connected to detector; a controlling device, the controlling device further comprising, an activation circuit, a radio frequency receiver which is electrically connected to the activation circuit, a DC power supply which is powered by 120 VAC mains power and which is electrically connected to the receiver and to the activation circuit, a controller which is powered by 120 VAC mains power and is connected to the activation circuit and to one or more motors which lower the storm shutter or shutters in the event of rain; and, optionally, manual override switches which are connected to the controlling device to manually control the position of the storm shutters.

14. The method of claim 13, wherein the controlling device provides 120 VAC power to the motors to raise the storm shutters a finite time interval after the sensor or sensors have become dry, the time interval being adjustable.

15. The device of claim 13, wherein the controlling device contains a clock timer to allow for raising and lowering the shutters at prescribed times.

16. The device of claim 13, wherein the detector contains the means for measuring a low battery condition and the transmitter sends a signal to the receiver to cause the motors to lower the shutters.

17. A device for controlling electrically-powered roll down storm shutters, the device comprising: a radio frequency transmitter; a detector which is electrically connected to the transmitter; a battery which is electrically connected to the transmitter and to the detector and supplies power to them; a rain sensor which is electrically connected to detector wherein the transmitter is of a frequency to communicate with a receiver/controller or receiver/controllers connected to a motor or motors for powering storm shutters.

18. The device of claim 17, wherein the detector contains the means for measuring a low battery condition and the transmitter sends a signal to the receiver/controller or receiver/controllers to cause the motor or motors to lower the shutters.

19. A device for controlling electrically-powered roll down storm shutters, the device comprising: a detector/activation circuit; a DC power supply which is powered by 120 VAC mains power and which is electrically connected to the detector/activation circuit; one or more rain sensors which are connected to the detector/activation circuit by means of a direct-wired connection; a controller which is powered by 120 VAC mains power and is electrically connected to the detector/activation circuit and to one or more motors which lower the storm shutters in the event of rain; and, optionally, manual override switches which are electrically connected to the controller to manually control the position of the storm shutters.

20. The method of claim 19, wherein the controlling device provides 120 VAC power to the motors to raise the storm shutters a finite time interval after the sensor or sensors have become dry, the time interval being adjustable.

21. The device of claim 19, wherein the controlling device contains a clock timer to allow for raising and lowering the shutters at prescribed times.

* * * * *